United States Patent

Kitch

[15] 3,704,069
[45] Nov. 28, 1972

[54] FILM PROCESSING APPARATUS

[72] Inventor: Paul E. Kitch, Springfield, Mass.

[73] Assignee: Scott Paper Company, Delaware County, Pa.

[22] Filed: April 26, 1971

[21] Appl. No.: 137,330

[52] U.S. Cl. .................355/110, 352/152, 355/101, 355/111
[51] Int. Cl. ...........................................G03b 27/10
[58] Field of Search........355/110, 99, 101, 103, 104, 355/108, 111, 50; 352/155, 152, 180

[56] References Cited

UNITED STATES PATENTS

| | | |
|---|---|---|
| 2,494,187 | 1/1950 | Mannon ....................352/152 |
| 3,168,743 | 2/1965 | Nesson .....................352/180 |
| 2,471,786 | 5/1949 | Shepler....................352/155 |
| 2,481,694 | 9/1949 | Schubert et al..............355/48 |
| 2,244,965 | 6/1941 | Roberts ....................355/111 |
| 2,525,522 | 10/1950 | Capstaff.................355/111 X |
| 3,374,723 | 3/1968 | Baumbach................355/103 |
| 2,077,486 | 4/1937 | Lootens.................355/111 X |

Primary Examiner—Samuel S. Matthews
Assistant Examiner—Richard L. Moses
Attorney—William J. Foley, Martin L. Faigus, John W. Kane, Jr. and John A. Weygandt

[57] ABSTRACT

Apparatus for processing or handling film such as in projection systems and the like, and particularly apparatus for the contact duplication of film, in which the shutter movement is film speed responsive, that is, the shutter position is determined by the speed of film movement through the exposure station so that the shutter closes when the speed of film movement drops to a level where heat-damage might commence to the film due to prolonged dwell in the exposure station where it is exposed to heat and light from the projection lamp. The apparatus also automatically dims the projection lamp when the shutter is closed, thereby increasing the life of the lamp. The apparatus further includes a pressure roll for engaging the film to obtain good contact between the films during exposure. The pressure roll is automatically removable from contact with the film when the shutter is closed, so as to facilitate feeding of a new film into the apparatus.

28 Claims, 2 Drawing Figures

INVENTOR.
PAUL E. KITCH
BY
ATTORNEY.

INVENTOR.
PAUL E. KITCH

FILM PROCESSING APPARATUS

BACKGROUND OF THE INVENTION

1. Field of the Invention

The present invention relates to film processing or handling apparatus, such as projection systems and the like, and particularly, to improvements in film duplication apparatus in which an original master film and a duplicate film are brought into overlying relationship with one another and light is projected through the master film and onto the duplicate film at an exposure station.

2. Description of the Prior Art

In the past, imaged transparent film has been processed or handled in a number of different forms of apparatus such as film projection apparatus, film duplication apparatus, and the like, in which the film is advanced through an exposure station where light is projected through it. For example, in projection equipment, high intensity light from a light source is projected through the film and through a lens system by means of which the image on the film is projected onto a screen remotely spaced from the film. In the contact duplication of film, however, an imaged master film is normally brought into contacting superimposed relationship with an unexposed duplicating film, and the two films are simultaneously moved in intimate engagement with one another through the exposure station where they are exposed to high intensity light projected from a light source.

One of the problems frequently experienced with such apparatus is blistering or melting of the film due to excessive heat generated by the light source which heat is transmitted by convection or radiation from the light source to the film, thereby causing film damage when the rate of film advance through the exposure station drops below a desired minimum. This problem most frequently occurs when, for one reason or another, the apparatus is turned off and the advance of the film therethrough is halted, since the excessive heat is applied to, and builds up in, one particular portion of the film, which then blisters, melts and is ruined. Operators often forget to turn off the projection lamp or to close a shutter, if one is available, before this damage occurs and, in some situations, their reaction may not be sufficiently quick to prevent damage.

Another problem with such equipment has been the unusually short life of the projection lamps used for supplying the high intensity light for film projection and film duplication. However, in the operation of such film projection or film duplication equipment, it is difficult for an operator to remember each time to turn off the power to the lamp when the apparatus is operated at a slower speed or is stopped. In addition, this step complicates the operation of the equipment. It is well-known that if the voltage applied to a lamp is reduced, the lamp will have an increased life. However, the circuitry required to automatically lower the voltage applied to the lamp in such apparatus in order to permit lamp dimming has not been provided.

It is common in such film projection and film duplication apparatus to maintain the film in a precise spatial relationship with the light source, and with the projection lens system if one is employed, as in projection apparatus, in order to maintain sharp focus of the image being projected. This may be accomplished in different ways in different forms of apparatus; for example, by guide plates between which the film passes, by a tension run of the film between two reels, or by a pressure roll running against a support surface such as the surface of another roll, so as to create a nip through which the film passes either immediately prior to and/or subsequent to the exposure station where the high intensity light passes through it.

In film duplication apparatus, and specifically that designed for reproducing microfilm by the contact printing method, it is extremely important that a pressure roll be used in combination with a support surface, generally the surface of a rotating support roll or drum, to create a pressure nip through which the two films, that is, the master film and the duplicating film, pass prior to the exposure station. This pressure nip eliminates any air gaps or spaces between the films which might allow undercutting of the image on the master film by non-perpendicular rays of light projected through it before the light strikes the duplicating film, and also eliminates concomitant loss of resolution.

However, with either type of such apparatus, it is often difficult to thread fresh film into the apparatus so equipped and through the pressure nip formed by the pressure roll and the support surface with which it cooperates.

In attempting to overcome the above-mentioned difficulties and shortcomings of prior art apparatus for processing or handling film or for duplicating film, a new and improved form of apparatus was discovered which reduced or eliminated the above-mentioned problems. Thus, it is a principal object and advantage of this invention to facilitate the duplication of film in an automatic manner while increasing the life of the projection lamp, facilitating the feeding of a film into the apparatus, and eliminating the risk of damage to the film due to excessive heat from the projection lamp.

A further object and advantage of this invention is to control the operation of a shutter between a projection lamp and film at an exposure station by means responsive to the speed of the film advancing through the exposure station.

A still further object and advantage of this invention is to control the level of intensity of the projection lamp in response to changes in the speed of the film advance through the exposure station or, alternatively, to the position of a shutter between the projection lamp and the film.

An even further object and advantage of this invention is to control the pressure roll in a film processing or handling apparatus, which employs a pressure roll nip to press the film into engagement with a support surface, so that the pressure roll position is dependent upon the speed of film advance through the exposure station or, alternatively, to the position of a shutter between the projection lamp and the film.

SUMMARY OF THE INVENTION

The present invention is a combination of elements in apparatus for handling film, in which an imaged film is moved through an exposure station where it is exposed to light. A particular embodiment of the combination of the present invention is used in apparatus for duplicating film wherein an original master film and a duplicate film are brought into overlying relationship with one another, and light is projected through the master film and onto the duplicate film at an exposure station. In the combination, film drive means are utilized for advancing the film or films through the exposure station. A light source directs light toward the film or films at the exposure station. A shutter is employed which has an open position in which it is withdrawn from the optical light path between the light source and the film or films at the exposure station, and a closed position in which it is disposed in the optical light path between the light source and the film or films at the exposure station. Shutter drive means are connected to the shutter for moving it between the open position and the closed position. Switching means are operably connected to the shutter drive means and to the film drive means for controlling the position of the shutter in response to the speed of the film drive means. This arrangement provides that the shutter will be closed, that is, it will be disposed between the high intensity light source and the films, when the speed of advance of the film through the apparatus falls below a certain level, or stops. Therefore, heat damage to the films is prevented.

Another embodiment of the invention is the combination in apparatus of the type broadly described above which includes means providing a support surface in the vicinity of the exposure station and a pressure roll moveable between a first position spaced from the support surface and the film or films, and a second position in which it presses the film or films into contact with the support surface and, in the case of several films into contact with each other. In this embodiment, the shutter is operably connected to the pressure roll to move it from the second position to the first position when the shutter moves to its closed position. This provides that the pressure roll will be disposed out of contact with the film and the support surface when the apparatus has slowed or is stopped and the shutter is closed, so that the new film can be conveniently fed into and through the apparatus.

Another embodiment of the present invention is the combination of elements in apparatus such as that broadly characterized above in which the high intensity light source is an electric light source, and a source of electric power is connected to the light source. A control circuit is interconnected between the electric power source and the light source for changing the amount of electric power transmitted to the light source and accordingly, the intensity of the light source. The control circuit is operable to change the intensity of the light source in response to movement of the shutter between the open position and the closed position.

BRIEF DESCRIPTION OF THE DRAWINGS

The above-mentioned and other objects, advantages and features of the present invention will become apparent from the following detailed description of the invention, when read in conjunction with the accompanying drawing, wherein.

DETAILED DESCRIPTION OF THE PREFERRED EMBODIMENT

Figure 1:
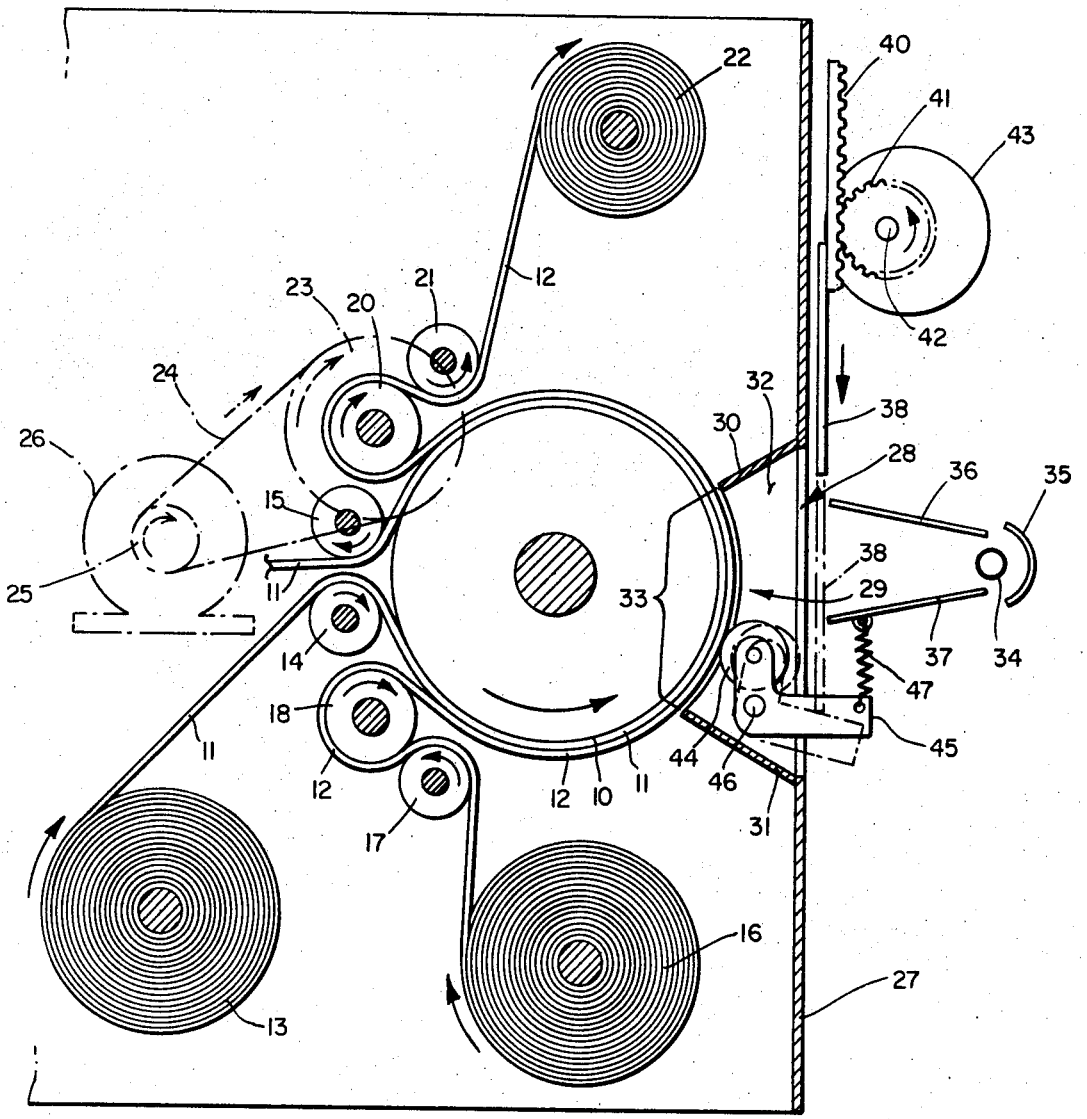
FIG. 1 is a sectional side elevation view of one form of film duplicating apparatus which includes the apparatus combination of the present invention.

FIG. 1 shows a portion of one form of film duplicating apparatus in which the present invention is utilized. The film duplicating apparatus includes a rotatably mounted support cylinder 10 on the surface of which an unimaged photosensitive duplicating film 11 is supported. An original master film 12, that is, a light-stable, previously exposed film which already contains a developed visible image, is superimposed upon the duplicating film 11. The films 11 and 12 are supported in this manner and run in contact with one another and the surface of the support cylinder 10 through about 270° of rotation of the support cylinder 10. The duplicating film 11 is fed onto the support cylinder 10 from a film reel 13 and after it passes around a guide roller 14. Upon leaving the support cylinder 10, the duplicating film 11 passes around a guide roller 15 and advances toward a developing chamber (not shown) where it is developed in accordance with well-known techniques, the nature of which depends upon the type of film system employed.

The duplicating film 11 is of a nature such that it is photosensitive, so that when it is exposed to a light-shadow image, as by transmission of light through the master film onto the duplicating film, a developable image will be created on the duplicating film. The duplicating film 11, for example, may be of a conventional silver halide form or of a conventional diazo form, the nature of each being well-known to those skilled in photography and copying.

The master film 12 is fed from a film reel 16 around a snubbing roller 17, and then around a guide roller 18, after which it is fed around the periphery of the support cylinder 10 on top of the duplicating film 11. Upon leaving the support cylinder 10 and the duplicating film 11, the master film 12 is fed around a guide roller 20 and then around a snubbing roller 21 and onto a take-up reel 22. The guide roller 20 has a pulley 23 which is connected by a belt 24 to a pulley 25 driven by a motor 26. The entire film system is driven by the motor 26 operating through the guide roller 20. Therefore, it is frictional force between the master film 12 and the outer periphery of the guide roller 20 which advances the duplicating film 11 and the master film 12 around the support cylinder 10 and through an exposure station described subsequently. Of course, suitable provision is made to drive the take-up reel 22 for the master film 12 and the take-up reel (not shown) for the duplicating film 11. For example, they may be driven by the motor 26 in a manner similar to guide roller 20 and at the same speed.

The side wall 27 of the duplicating apparatus has an opening 28 therein radially disposed from the support cylinder 10. A light chamber 29 is formed by spaced-apart upper and lower inclined walls 30 and 31, respectively, radially extending from the side wall 27 at the top and bottom of the opening 28 to a point closely spaced from the surface of the support cylinder 10, and side walls 32, only one of which is shown, which connect the respective ends of upper and lower walls 30 and 31 to generally define an exposure station, indicated generally by the bracket 33. Thus, exposure of the duplicating film 11 to light projected through the master film 12 only occurs when the films 11 and 12 pass over the support cylinder 10 between the lower side wall 31 and the upper side wall 30.

A lamp 34 is spaced from the side wall 27 in line with the opening 28 therein. The lamp 34 is partially enclosed by an arcuate reflecting element 35 and outwardly diverging upper and lower reflecting elements 36 and 37, respectively, spaced apart from one another. All of the reflecting elements 35, 36 and 37 have highly polished surfaces and combine to project light from the lamp 34 through the opening 28 into the light chamber 29 and through the master film 12 onto the duplicating film 11 as they move through the exposure station 33. The lamp 34 may comprise any of the high intensity electric light sources typically employed in projection apparatus and film duplicating equipment.

A shutter 38 is disposed adjacent the side wall 27 and the opening 28 therein, and is movable from an open position where it is adjacent the side wall 27 as shown in FIG. 1 in solid line, to a closed position where it is in front of the opening 28 and is in front of the space between the reflecting elements 36 and 37, as shown in phantom line in FIG. 1. In the open position, light from the lamp 34 can strike the films 11 and 12 at the exposure station 33, but in the closed position, light which enters the light chamber 29 is essentially precluded from striking the films 11 and 12 at the exposure station 33. Movement of the shutter 38 is accomplished by a rack and pinion mechanism, the shutter 38 being attached to the lower end of the rack 40 which is meshed with and driven by a pinion gear 41 which is attached to the shaft 42 of a shutter drive motor 43. The shutter drive motor 43 is a reversible AC motor and a mechanism for controlling the direction of its operation is described subsequently.

A pressure roller 44 is disposed within the light chamber 29 and arranged to contact the surface of the master film 12 to press it against the duplicating film 11 just prior to the point where the films 11 and 12 are struck by light. This pressure substantially eliminates any air gaps between the two films 11 and 12 and ensures uniform contact therebetween which is essential to avoid undercutting of the image on the master film 12 during exposure of the duplicating film 11 thereunder to light. In the duplication of film images, and particularly micro-images on microfilm, close contact during exposure to light is extremely important to avoid the loss of resolution which otherwise occurs due to non-radial light rays passing through the imaged film. Such diverging light rays which unavoidably eminate from a light source unless optically redirected, tend to undercut the image on the master film 12 if the master film 12 and the duplicating film 11 are not in close contact with one another.

The pressure roller 44 is rotatably mounted on one end of a pivotably mounted support arm 45 which pivots about a pin 46 connected to the side plate 32. The other end of the support arm 45 is connected by a tension spring 47 to the back side of the lower reflecting element 31. From this arrangement, it can be seen that the pressure roller 44 is spring-biased into contact with the master film 12 when the shutter 38 is open.

In accordance with the invention, the pressure roller 44 is moved away from and out of contact with the master film 12 when the shutter 38 is moved to its closed position. This is accomplished by the lower end of the shutter 38 striking the support arm 45 holding the pressure roller 44 and overcoming the force of the spring 47 by the force of the shutter drive motor 43 operating through the rack 40 and pinion gear 41 so that the pressure roller 44 is pivoted out of contact with the master film 12. This position of the support arm 45 and pressure roller 44 is shown in phantom in FIG. 1.

Figure 2:
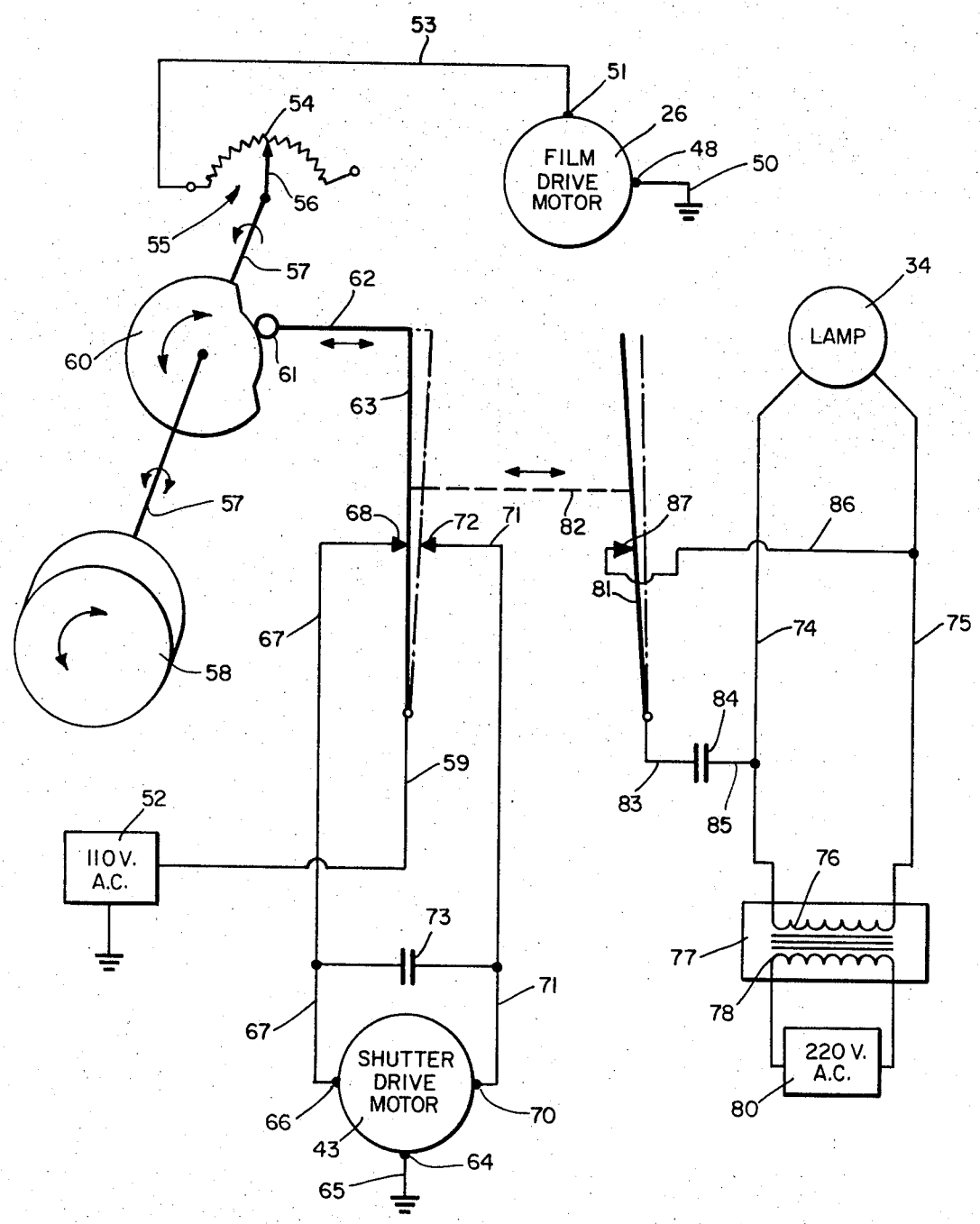
FIG. 2 is a schematic diagram of a portion of the electrical-mechanical system used in the apparatus shown in FIG. 1 and included in the apparatus combination of the present invention.

FIG. 2 is a schematic diagram of an electrical-mechanical system for accomplishing some of the functions of portions of the apparatus described above. The film drive motor 26 which drives the guide roller 20 has one terminal 48 electrically connected to ground by a conductor 50 and the other terminal 51 electrically connected to a power source 52 in the manner described subsequently.

The terminal 51 is initially connected by a conductor 53 to one end of a resistor 54 on a rheostat, indicated generally by reference numeral 55. A conductive pointer 56 on the rheostat 55 is connected to a rotatable conductive shaft 57, the opposite end of which is connected to a control knob 58. Thus, by turning the knob 58 about its rotational axis, the shaft 57 rotates and the position of the pointer 56 on the rheostat 55 is changed to place a different resistance level between the pointer 56 and the film drive motor 26. A conductive cam 60 is fixed to the rotatable shaft 57 so that it rotates with the shaft 57. A rotatably mounted conductive cam follower 61 contacts a portion of the cam 60 and is connected by a reciprocating conductive linkage element 62 to an upstanding conductive switch element 63 which pivots about its lower end. The switch element 63 is connected by a conductor 59 to the electrical power source 52 which supplies 110 volts A.C. In this manner, power is supplied to the film drive motor 26 and, upon rotation of the control knob 58, the cam 60 will move the cam follower 61 in a manner dependent upon the amount of power being supplied to the film drive motor 26 as determined by the position of the pointer 56 along the resistor 54 of the rheostat 55.

The shutter drive motor 43 is a reversible electric motor, the electrical design characteristics of which permit it to be stalled without overheating for long periods of time. One terminal 64 thereof is electrically connected by conductor 65 to ground. Another terminal 66 thereof is electrically connected by a conductor 67 to a switch contact 68 which electrically engages the switch element 63 when the cam follower 61 is in the radially inward or low portion of the cam 60 indicating operation of the film drive motor 26 at a suitable speed to prevent burning of the films 11 and 12. In this mode of operation, the shutter drive motor 43 receives power from the electrical power source 52, and the shutter 38 is driven into its open position where light is permitted to pass from the light source or lamp 34 through the opening 28 and onto the films 11 and 12 at the exposure station 33.

The other terminal 70 of the shutter drive motor 43 is connected by a conductor 71 to a second switch contact 72 which electrically engages the switch element 63 when it is in the position shown in phantom line in FIG. 2. The switch element 63 is advanced to that position by the linkage element 62 when the pointer 56 of the rheostat 55 moves to the end of the resistor 54 on the rheostat 55 such that the film drive motor 26 is too slow or is stopped. In that event, the cam 60 has been rotated by the control knob 58 so that the cam follower 61 rests on its radially outermost or highest portion, thereby forcing the conductive linkage element 62 and the switch element 63 to the right. This causes the switch element 63 to engage the switch contact 72 and to break electrical engagement with the switch contact 68. Power now flows from the electrical power source 52 through the conductor 59 through the switch element 63 to the switch contact 72 and through the conductor 71 to the shutter drive motor 43 to operate it in the opposite direction. In this mode of operation, the shutter 38 is moved to its closed position where it prevents light and heat from the light source or lamp 34 from striking the films 11 and 12 and burning them when they are not being advanced at all or sufficiently rapidly through the duplicating apparatus. The conductor 71 and the conductor 67 are connected by a capacitor 73 which effects the necessary change of polarity to reverse the direction of the shutter drive motor 43.

The light source or lamp 34 is connected in series by conductors 74 and 75 to the high voltage coil 76 of a step-up transformer 77, the low voltage coil 78 of which is connected to an electrical power source 80 which supplies 220 volts A.C. In this manner, a relatively high voltage is supplied to the lamp 34 to operate it at full intensity so as to provide the required high illumination conditions for rapid film duplication. In accordance with the invention, however, a system is provided to decrease the voltage applied to the lamp 34 and, accordingly, its intensity when the shutter drive motor 43 moves the shutter 38 to its closed position.

As shown in FIG. 2, an upstanding switch element 81 is pivotably supported at its lower end and is operably connected by a linkage element 82 shown in phantom line to the upstanding switch element 63. The lower end of the switch element 81 is electrically connected by a conductor 83 to a capacitor 84, the other side of which is connected by a conductor 85 to the conductor 74. Another conductor 86 extends from the conductor 75 to a switch contact 87 which is engaged by the switch element 81 until it is moved by the cam follower 61 and the linkage elements 62 and 82 through the switch element 63 to the position shown in phantom. As pointed out previously, this movement occurs when the speed of the film drive motor 26 falls below a predetermined level or stops as indicated by the position of the pointer 56 along the resistor 54 of the rheostat 55. This causes cam 60 to move and the cam follower 61 to be moved radially outwardly by the higher portion of the cam 60 thereby advancing linkage element 62, the switch element 63, the linkage element 82, and the switch element 81 to the right so that the switch element 81 electrically disengages the switch contact 87. The initial circuit places the capacitor 84 in parallel with the high voltage coil 76 of the step-up transformer 77, thereby increasing the voltage applied to the lamp 34. When the capacitor is removed from the circuit as by opening the switch 81, 87, the intensity of the light source or lamp 34 is diminished, thereby greatly extending its life for useful operation of the film duplication apparatus.

In view of the above description of the invention and of the drawings, it can be seen that the invention provides a combination of elements which eliminates many of the problems of prior art film handling or processing apparatus and particularly problems experienced with film duplication apparatus employed in the past. In particular, the apparatus of the invention automatically eliminates any risk of damage to the master film or the duplicating film at the exposure station when the apparatus is stopped or the films are fed through it too slowly. In addition, the apparatus provides a means for automatically controlling the position of a pressure roller which is important particularly in film duplication apparatus to press the master film and the duplicating film together. This permits new films to be fed into the apparatus without the difficulty previously experienced where the pressure roll blocked the entrance of a new film into the apparatus. Furthermore, the apparatus provides a means for greatly extending the life of the projection lamp by reducing its intensity during periods where film duplication is not taking place and the shutter is closed.

From the above description, it will be apparent that various modifications in the apparatus described in detail herein may be made within the scope of the invention. For example, while a rheostat has been disclosed for controlling the speed of the film drive motor, some other more sophisticated electrical control apparatus might be employed to accomplish that purpose. In addition, the system might be made more automatic so that rather than using a control knob to control the speed of the film drive motor, the film drive motor might advantageously be made to be responsive to the light intensity striking the film as by monitoring and control equipment well-known to those skilled in the art. Such equipment is clearly within the scope of this invention. It will be apparent, of course, that depending upon the type of film and the effect desired, the control apparatus could be made to operate the various switches either when the film drive motor stops completely or when the film drive motor is operated below a predetermined speed. This feat may be accomplished by proper design of the cam 60 shown in FIG. 2, as will be apparent to a person of ordinary engineering background, or by some other more elaborate system equally within the ability of such a person. Similarly, the respective mechanisms for controlling the position of the pressure roller and the intensity of the projection lamp could be different from those shown without departing from the scope of the invention. Therefore, the invention is not to be limited to the specific details of the apparatus described herein except as may be required by the following claims.

What is claimed is:

1. In apparatus for handling film, wherein an imaged film is moved through an exposure station where it is exposed to light, the combination of:
   film drive means for advancing said film through said exposure station,
   control means for controllably altering the speed of said film drive means,
   a light source for directing light toward said film at said exposure station,
   a shutter having an open position in which it is withdrawn from the optical light path between said light source and said film at said exposure station, and a closed position in which it is disposed in the optical light path between said light source and said film at said exposure station, shutter drive means connected to said shutter for moving it between said open position and said closed position, said shutter drive means including a reversible drive motor, and switching means operably connected to said reversible drive motor and to said control means for causing said reversible drive motor to move said shutter into said closed position when the speed of said film drive means drops below a predetermined level determined by said control means.

2. In apparatus for handling film wherein an imaged film is moved through an exposure station where it is exposed to light, the combination of:

film drive means for advancing said film through said exposure station, a light source for directing light toward said film at said exposure station, a shutter having an open position in which it is withdrawn from the optical light path between said light source and said film at said exposure station, and a closed position in which it is disposed in the optical light path between said light source and said film at said exposure station, shutter drive means connected to said shutter for moving it between said open position and said closed position, switching means operably connected to said shutter drive means and to said film drive means for controlling the position of said shutter in response to the speed of said film drive means, and means providing a support surface in the vicinity of said exposure station, and a pressure roll movable between a first position spaced from said support surface and said film and a second position in which it presses said film into contact with said support surface.

3. The combination in apparatus for handling film according to claim 2, wherein said shutter cooperates with said pressure roll to move said pressure roll between said first position and said second position as it moves between said open position and said closed position.

4. The combination in apparatus for handling film according to claim 2, wherein said pressure roll is biased in said first position, and said shutter is arranged to move said pressure roll into said second position to press said film against said support surface when said shutter is advanced to said closed position.

5. In apparatus for handling film, wherein an imaged film is moved through an exposure station where it is exposed to light, the combination of:

film drive means for advancing said film through said exposure station, a light source for directing light toward said film at said exposure station, a shutter having an open position in which it is withdrawn from the optical light path between said light source and said film at said exposure station, and a closed position in which it is disposed in the optical light path between said light source and said film at said exposure station, shutter drive means connected to said shutter for moving it between said open position and said closed position, switching means operably connected to said shutter drive means and to said film drive means for controlling the position of said shutter in response to the speed of said film drive means, and a source of electric power connected to said light source, a control circuit interconnected between said electric power source and said light source for changing the amount of electric power transmitted to said light source and accordingly, the intensity of said light source, said control circuit being operatively connected to said switching means to change the intensity of said light source in response to the speed of said film drive means to reduce the intensity of said light source when said shutter moves to said closed position.

6. In apparatus for handling film wherein an imaged film is moved through an exposure station where it is exposed to light, the combination of:

film drive means for advancing said film through said exposure station, a light source for directing light toward said film at said exposure station, a shutter having an open position in which it is withdrawn from the optical light path between said light source and said film at said exposure station, and a closed position in which it is disposed in the optical light path between said light source and said film at said exposure station, shutter drive means connected to said shutter for moving it between said open position and said closed position, switching means operably connected to said shutter drive means and to said film drive means for controlling the position of said shutter in response to the speed of said film drive means, and a source of electric power connected to said light source, a control circuit interconnected between said electric power source and said light source for changing the amount of electric power transmitted to said light source and, accordingly, the intensity of said light source, said control circuit being operatively connected to said switching means to change the intensity of said light source in response to the speed of said film drive means to reduce the intensity of said light source in an amount proportional to a decrease in speed of said film drive means.

7. In apparatus for handling film, wherein an imaged film is moved through an exposure station where it is exposed to light, the combination of:

film drive means for advancing said film through said exposure station, a light source for directing light toward said film at said exposure station, a shutter having an open position in which it is withdrawn from the optical light path between said light source and said film at said exposure station, and a closed position in which it is disposed in the optical light path between said light source and said film at said exposure station, shutter drive means connected to said shutter for moving it between said open position and said closed position, switching means operably connected to said shutter drive means and to said film drive means for controlling the position of said shutter in response to the speed of said film drive means, and said light source including light control means for changing the intensity of said light source, said light control being actuatable by said shutter.

8. In apparatus for duplicating film wherein an original master film and a duplicate film are brought into overlying relationship with one another and light is projected through said master film and onto said duplicate film at an exposure station, the combination of:

film drive means for advancing said films through said exposure station, a light source for directing light toward said films at said exposure station, a shutter having an open position in which it is withdrawn from the optical light path between said light source and said films at said exposure station, and a closed position in which it is disposed in the optical light path between said light source and said films at said exposure station, shutter drive means connected to said shutter for moving it between said open position and said closed position, and switching means operably connected to said shutter drive means and to said film drive means for controlling the position of said shutter in response to the speed of said film drive means.

9. The combination in apparatus for duplicating film according to claim 8, including control means for controllably altering the speed of said film drive means.

10. The combination in apparatus for duplicating film according to claim 8, wherein said switching means are operably connected to said shutter drive means and to said control means for changing the position of said shutter when the speed of said film drive means reaches a predetermined level.

11. The combination in apparatus for duplicating film according to claim 8, wherein said shutter drive means includes a reversible drive motor, and wherein said switching means are operably connected to said reversible drive motor and to said control means for causing said reversible drive motor to move said shutter into said closed position when the speed of said film drive means drops below a predetermined level determined by said control means.

12. The combination in apparatus for duplicating film according to claim 8, including means providing a support surface in the vicinity of said exposure station, and a pressure roll movable between a first position spaced from said support surface and said films and a second position in which it presses said films into contact with said support surface.

13. The combination in apparatus for duplicating film according to claim 12, wherein said shutter cooperates with said pressure roll to move said pressure roll between said first position and said second position as it moves between said open position and said closed position.

14. The combination in apparatus for duplicating film according to claim 12, wherein said pressure roll is biased in said first position, and said shutter is arranged to move said pressure roll into said second position to press said films against said support surface when said shutter is advanced to said closed position.

15. The combination in apparatus for duplicating film according to claim 8, wherein said light source is electrically operated, and said apparatus includes a source of electric power connected to said light source, a control circuit interconnected between said electric power source and said light source for changing the amount of electric power transmitted to said light source and, accordingly, the intensity of said light source, said control circuit being operatively connected to said switching means to change the intensity of said light source in response to the speed of said film drive means.

16. The combination in apparatus for duplicating film according to claim 15, wherein said control circuit reduces the intensity of said light source when said shutter moves to said closed position.

17. The combination in apparatus for duplicating film according to claim 15, wherein said control circuit reduces the intensity of said light source in an amount proportional to a decrease in speed of said film drive means.

18. The combination in apparatus for duplicating film according to claim 8, wherein said light source includes light control means for changing the intensity of said light source, said light control means being actuatable by said shutter.

19. In apparatus for handling film, wherein an imaged film is moved through an exposure station where it is exposed to light from a light source, the combination of:

means providing a support surface in the vicinity of said exposure station, a pressure roll movable between a first position spaced from said support surface and said film and a second position in which it presses said film into contact with said support surface, and a shutter movable between an open position in which it is out of the light path between said light source and said film at said exposure station, and a closed position in which it is disposed in said light path between said light source and said film at said exposure station, said shutter being operably connected to said pressure roll to move it from said second position to said first position when said shutter moves to its closed position.

20. The combination in apparatus for handling film according to claim 19, wherein said support surface comprises the surface of a rotatably mounted support roll over which said film is carried as it moves through said exposure station.

21. The combination in apparatus for handling film according to claim 19, including means for biasing said pressure roll into said second position when said shutter is in its open position.

22. In apparatus for duplicating film, wherein an original master film and a duplicate film are brought into overlying relationship with one another and light from a light source is projected through said master film and onto said duplicate film at an exposure station, the combination of:

means providing a support surface in the vicinity of said exposure station, a pressure roll movable between a first position spaced from said support surface and said film and a second position in which it presses said film into contact with said support surface, and a shutter movable between an open position in which it is out of the light path between said light source and said film at said exposure station, and a closed position in which it is disposed in said light path between said light source and said film at said exposure station, said shutter being operably connected to said pressure roll to move it from said second position to said first position when said shutter moves to its closed position.

23. The combination in apparatus for duplicating film according to claim 22, wherein said support surface comprises the surface of a rotatably mounted support roll over which said film is carried as it moves through said exposure station.

24. The combination in apparatus for duplicating film according to claim 22, including means for biasing said pressure roll into said second position when said shutter is in its open position.

25. In apparatus for handling film, wherein an imaged film is moved through an exposure station where it is exposed to light, including an electric light source directing light toward said film when it is disposed at said exposure station, a source of electric power connected to said light source, film drive means for advancing said film through said exposure station, and a shutter movable between an open position in which it is out of the light path between said light source and said film at said exposure station, and a closed position in which it is disposed in the light path between said light source and said film, the improvement comprising a control circuit interconnected between said electric power source and said light source for changing the amount of electric power transmitted to said light source and, accordingly, the intensity of said light source, said control circuit being operable to change the intensity of said light source in response to movement of said shutter between said open position and said closed position.

26. The improvement in apparatus for handling film according to claim 25, wherein said control circuit is operable to reduce the intensity of said light source when said shutter is moved to said closed position.

27. In apparatus for duplicating film, wherein an original master film and a duplicate film are brought into overlying relationship with one another and light is projected through said master film and onto said duplicate film at an exposure station, including an electric light source directing light toward said master film when it is disposed at said exposure station, a source of electric power connected to said light source, film drive means for advancing said films through said exposure station, and a shutter movable between an open position in which it is out of the light path between said light source and said master film at said exposure station, and a closed position in which it is disposed in the light path between said light source and said master film, the improvement comprising a control circuit interconnected between said electric power source and said light source for changing the amount of electric power transmitted to said light source and, accordingly, intensity of said light source, said control circuit being operable to change the intensity of said light source in response to movement of said shutter between said open position and said closed position.

28. The improvement in apparatus for duplicating film according to claim 27, wherein said control circuit is operable to reduce the intensity of said light source when said shutter is moved to said closed position.

* * * * *